Figure 1:
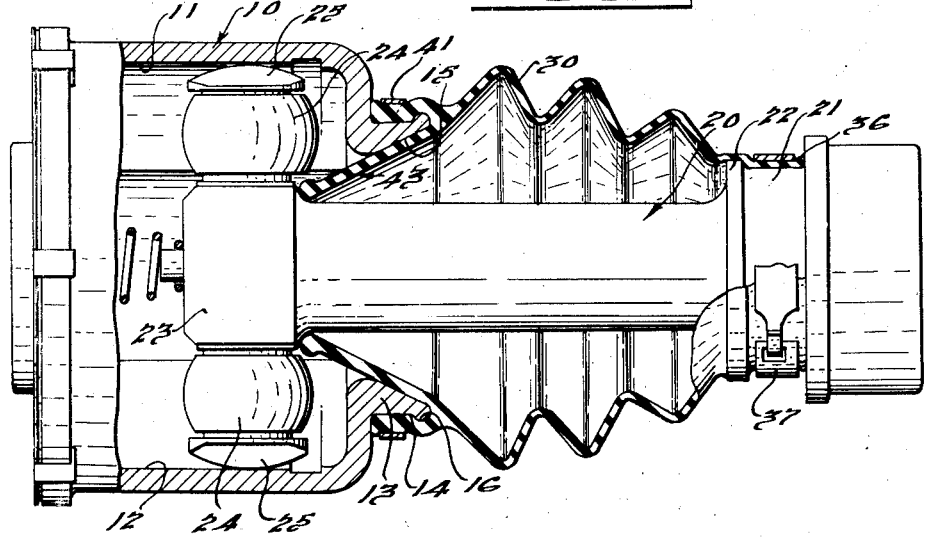

Jan. 12, 1943.   J. W. HAGERTY   2,308,073
BOOT FOR UNIVERSAL JOINTS
Filed Aug. 2, 1940

INVENTOR
Joseph William Hagerty.
BY
Harness, Dickey & Pierce.
ATTORNEYS.

Patented Jan. 12, 1943

2,308,073

UNITED STATES PATENT OFFICE 2,308,073

BOOT FOR UNIVERSAL JOINTS

Joseph William Hagerty, Detroit, Mich., assignor to Universal Products Company, Incorporated, Dearborn, Mich., a corporation of Delaware Application August 2, 1940, Serial No. 349,571

2 Claims. (Cl. 64—32)

The invention relates generally to universal joints and it has particular relation to a boot for preventing dirt and other foreign matter from entering the joint and for preventing lubricant from escaping from the joint.

In certain respects the invention constitutes an improvement over that embodied in Wollner Patent No. 2,085,284 and the boot is applicable to the same type of joint as disclosed in that patent.

One object of the invention is to provide an improved boot structure which will have greater resistance to injury or cutting such as occasionally is caused by stones or the like during travel of the motor vehicle.

Another object of the invention is to provide an improved structure having the aforesaid characteristics, which also possesses satisfactory resistance to the deteriorating action of hydrocarbon greases ordinarily in contact with at least a part of the boot.

Another object of the invention is to provide a one piece boot structure which is molded from rubber-like material, thereby eliminating operations required in separately fabricating different parts and then fastening them together.

And in general it is an object of the invention to provide a one piece rubber boot structure of the type stated heretofore which is efficient and durable in use.

Other objects of the invention will become apparent from the following specification, from the drawing relating thereto, and from the claims hereinafter set forth.

Figure 2:
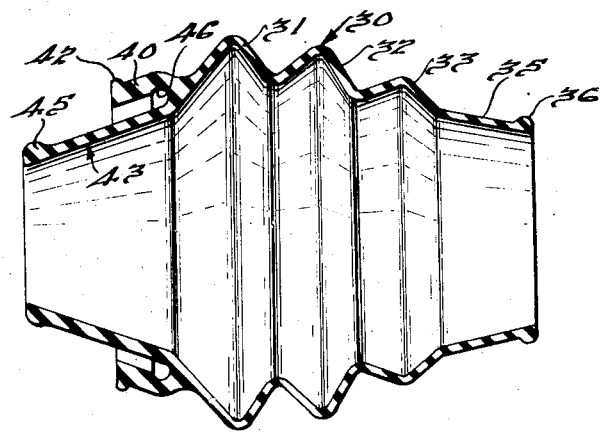

For a better understanding of the invention, reference may be had to the drawing, wherein:

Figure 1 is a fragmentary, cross-sectional view of a shaft and universal joint having a boot thereon constructed according to one form of the invention; and Fig. 2 is a cross-sectional view of the boot shown by Fig. 1, with the boot removed from the joint.

Referring to Figure 1, the universal joint shown comprises a housing 10 having diametrically opposite, cylindrical guides 11 and 12 and an annular inwardly disposed flange or rim 13 at one end. This rim has an inner surface which is outwardly flared as indicated at 15 so as to provide generally a conically shaped opening for the end of the housing, with the opening flared outwardly into larger diameter, while its outer surface 14 may be similarly flared or it may have more of a cylindrical character as shown. A bead 16 at the end of the rim provides an abutment for assisting in the retention of a part of the boot presently to be described.

A shaft 20, having an enlarged cylindrical portion 21 and a retaining flange or collar 22 at one end of such portion, extends through the opening in the housing 10 and at its inner end has an integral head 23 disposed between the cylindrical guides 11 and 12. The head 23 has a pin extending diametrically therethrough and into the guides 11 and 12 and a rotary bell element 24 is rotatably and slidably mounted on each of the projecting ends of the pin. Roller bearings are provided around each projecting end of the pin and between its surface and the inner surface of the ball 24 and outwardly of the ball, a button 25 is disposed on each end of the pin. These and other details of the joint may generally correspond to those found in Warner Patent No. 1,921,274.

In connection with a joint of this character, the housing 10 is fastened at its left end to the driving shaft of the automobile and the shaft 20 may constitute the transmission shaft. Universal movement of the shaft 20 with respect to the housing 10 is permitted by the conical opening in the end of the housing and by the pivotal arrangement of the head 23 and parts thereon within the housing.

It is apparent that the shaft 20 may slide axially relative to the housing 10, during which time the balls 24 roll in the guides 11 and 12, that the shaft may oscillate about the axis of the pin extending through the head 23 and the balls 24 and that the shaft may oscillate in the plane of the guides, during which movement the balls 24 will move in and outwardly on the ends of the pin. A joint of this type is provided with a definite amount of grease placed within the body 10 and normally it is desired that the grease will last for the life of the motor vehicle and therefore that servicing normally will not be required.

For preventing the escape of lubricant and also preventing the ingress of dirt, water, or other foreign matter, a boot is provided which is made of material comprising rubber or rubber-like material, which is flexible. Elastic and flexible natural rubber or synthetic rubber may be employed and in the case of synthetic rubber, Neoprene or Perbunan may be used. It is desirable in a boot for this purpose to use material which strongly resists hydrocarbon greases such as used in joints, and extreme temperature changes, without losing its elasticity or other normal characteristics. Neoprene and Perbunan have been found to perform satisfactorily in these respects as synthetic rubbers when used in the boot.

The boot comprises an outer bellows portion 30 having corrugations 31, 32, and 33, that are arranged in a conical formation, and it will be observed that the corrugation 33 is less in depth than the corrugations 31, 32. At its right end, as shown in Figure 2, the boot terminates in a non-corrugated normally tapered portion 35 adapted to encircle the cylindrical portion 21 of the shaft 20, although it should be understood that this portion of the boot may initially be of cylindrical or other shape if found desirable. A bead 36 is provided at the extreme end of the portion 35, and when the end of the boot is on the portion 21 of the shaft, a clamp 37 is employed for clamping it in position. It will be apparent that the bead 36 will resist pulling of the rubber from under the clamp and also that the collar 22 will hold the clamp against movement on to the smaller portion of the shaft. The type of clamping means employed is disclosed in Miquelon Patent No. 1,982,445.

The opposite end of the boot has a thickened rim or flange 40 adapted to extend over the rim or flange 13 on the housing 10 and when so positioned, a second clamp 41 is employed for clamping the rim 40 in place. It will be noted that the free end of the flange 40 has a bead 42 for preventing removal of the flange from under the clamp and that the bead 16 on the housing flange 13 coacts with an internal groove 46 on the flange 40 to prevent removal of the clamp.

It may be observed that the flange 40 and end portions 35 of the boot may be of such dimensions as to require either or both to be expanded or stretched slightly in applying such parts to the housing flange 13 and shaft part 21, so that either or both parts may have an elastic grip on the metal it encircles. This elastic grip may be obtained by dimensions of parts, wether the suface 14 on the housing flange or the shaft part 21 are cylindrical or otherwise and whether or not the rubber flange 40 and end portion 35 initially are tapered or otherwise shaped. An elastic gripping relation of rubber to metal assists in retaining the parts in position prior to, during, and after application of the clamps and also tends to prevent wrinkling of rubber under the clamps.

A frustoconical portion 43 extends from a point adjacent the inner end of the rim 40 and this portion is adapted to extend along the surface 15 of the housing rim 13 to a point in proximity to the outer surface of the shaft 20 adjacent the head 23 on the inner end thereof. A bead 45 on the outer surface of the portion 43 at the inner end thereof provides greater resistance to tearing, stretching, and also deformation. It will be observed that the portion 43 and the rim portion 40 are both thicker than the rubber in the bellows part of the boot, and in this connection it is desirable that the portion 43 substantially maintain its form so as to prevent leakage of lubricant from the housing. The outer thickened rim 40 strengthens the boot at the junction of the two portions and also provides a stronger means for holding the boot on the housing 10.

The boot being flexible and elastic allows movement of the shaft relative to the housing without injuring the material and at all times it prevents water or dirt from entering the joint while at the same time retaining the grease therein. By using rubber-like material which is oil resisting and resistant to temperature changes and also durable, satisfactory performance of the boot as well as the joint is promoted and assured.

Although only one form of the invention has been described and illustrated in detail, it will be apparent to those skilled in the art that various modifications may be made without departing from the scope of the appended claims.

What is claimed is:

1. A boot for a universal joint wherein the latter has a housing provided with an opening at one end bordered by a flange and a shaft projecting into such opening and adapted to have universal movement with respect to the housing, comprising an outer conically directed bellows adapted to enclose the shaft externally of the housing and having an annular wall portion at its smaller end which is adapted to be clamped about the outer portion of the shaft, an inner frusto-conical portion joined at its larger end to the larger end of the bellows and adapted to extend within the housing flange and to have its smaller end substantially contacting the inner part of the shaft, and a flange at the junction of the bellows and said frusto-conical portion extending in the same direction as the latter and which is adapted to encircle the outer surface of the housing flange, said parts of the boot being integral and constructed of molded rubber-like stretchable material and the flange part thereof being initially molded to conical formation generally parallel to said frusto-conical part of the boot.

2. A boot for a universal joint wherein the latter has a housing provided with an opening at one end bordered by a flange and a shaft projecting into such opening and adapted to have universal movement with respect to the housing, comprising an outer conically directed bellows adapted to enclose the shaft externally of the housing and having an annular wall portion at its smaller end which is adapted to be clamped about the outer portion of the shaft, an inner frusto-conical portion joined at its larger end to the larger end of the bellows and adapted to extend within the housing flange and to have its smaller end substantially contacting the inner part of the shaft, and a flange at the junction of the bellows and said frusto-conical portion extending in the same direction as the latter and which is adapted to encircle the outer suface of the housing flange, said parts of the boot being integral and constructed of molded rubber-like stretchable material and the flange part thereof being initially molded to conical formation generally parallel to said frusto-conical part of the boot and being of such dimensions that the smaller end of the flange must be expanded over the housing flange whereby it will elastically grip the latter.

JOSEPH WILLIAM HAGERTY